United States Patent
Etchegoyen (10) Patent No.: US 9,143,496 B2
(45) Date of Patent: Sep. 22, 2015

(54) DEVICE AUTHENTICATION USING DEVICE ENVIRONMENT INFORMATION

(71) Applicant: UNILOC LUXEMBOURG, S.A., Luxembbourg (LU)

(72) Inventor: Craig S. Etchegoyen, Plano, TX (US)

(73) Assignee: Uniloc Luxembourg S.A., Luxembourg (LU)

( * ) Notice: Subject to any disclaimer, the term of this patent is extended or adjusted under 35 U.S.C. 154(b) by 0 days.

(21) Appl. No.: 13/914,584

(22) Filed: Jun. 10, 2013

(65) Prior Publication Data

US 2014/0282933 A1    Sep. 18, 2014

Related U.S. Application Data

(60) Provisional application No. 61/780,289, filed on Mar. 13, 2013.

(51) Int. Cl.
*H04L 29/06* (2006.01)
*H04L 9/32* (2006.01)
*H04W 12/06* (2009.01)
*H04W 12/04* (2009.01)

(52) U.S. Cl.
CPC *H04L 63/08* (2013.01); *H04L 9/32* (2013.01); *H04W 12/06* (2013.01); *H04W 12/04* (2013.01)

(58) Field of Classification Search
CPC .................................. H04L 63/08; H04L 9/32
USPC .................................. 713/168, 169, 170, 171
See application file for complete search history.

(56) References Cited

U.S. PATENT DOCUMENTS

| | | |
|---|---|---|
| 4,246,638 A | 1/1981 | Thomas |
| 4,779,224 A | 10/1988 | Moseley et al. |
| 4,891,503 A | 1/1990 | Jewell |
| 4,956,863 A | 9/1990 | Goss |

(Continued)

FOREIGN PATENT DOCUMENTS

| | | |
|---|---|---|
| EP | 1 739 879 | 6/2005 |
| EP | 1 637 958 | 3/2006 |

(Continued)

OTHER PUBLICATIONS

Martinez et al.; Environmental sensor networks; Published in: Computer (vol. 37 , Issue: 8 ); Date of Publication : Aug. 2004; pp. 50-56; IEEE Xplore.*

(Continued)

*Primary Examiner* — Bradley Holder
(74) *Attorney, Agent, or Firm* — Sean D. Burdick (57) ABSTRACT

A device authentication server authenticates a remotely located device using a detailed history of movement of the device. Such movement history is represented by data representing a history of the external state of the device within a physical environment, examples of which include accelerometer logs, orientation logs, and magnetic field logs. To authentication of the device, the device authentication server sends a device key challenge to the device. The device key challenge specifies a randomized selection of device attribute parts to be collected from the device and the manner in which the device attribute parts are to be combined to form a device key. The device key is data that identifies and authenticates the device and includes a device identifier and device environmental data for comparison to reference device environmental data.

9 Claims, 10 Drawing Sheets

(56) References Cited

U.S. PATENT DOCUMENTS

| | | | |
|---|---|---|---|
| 5,210,795 A | 5/1993 | Lipner et al. | |
| 5,235,642 A | 8/1993 | Wobber et al. | |
| 5,239,166 A | 8/1993 | Graves | |
| 5,241,594 A | 8/1993 | Kung | |
| 5,666,415 A | 9/1997 | Kaufman | |
| 6,041,411 A | 3/2000 | Wyatt | |
| 6,161,185 A | 12/2000 | Guthrie et al. | |
| 6,167,517 A | 12/2000 | Gilchrist et al. | |
| 6,243,468 B1 | 6/2001 | Pearce et al. | |
| 6,330,608 B1 | 12/2001 | Stiles | |
| 6,418,472 B1 | 7/2002 | Mi et al. | |
| 6,539,479 B1 | 3/2003 | Wu | |
| 6,799,272 B1* | 9/2004 | Urata | 713/171 |
| 6,826,690 B1 | 11/2004 | Hind et al. | |
| 6,981,145 B1* | 12/2005 | Calvez et al. | 713/170 |
| 7,082,535 B1 | 7/2006 | Norman et al. | |
| 7,083,090 B2* | 8/2006 | Zuili | 235/383 |
| 7,100,195 B1 | 8/2006 | Underwood | |
| 7,178,025 B2 | 2/2007 | Scheidt et al. | |
| 7,181,615 B2* | 2/2007 | Fehr et al. | 713/156 |
| 7,233,997 B1 | 6/2007 | Leveridge et al. | |
| 7,234,062 B2* | 6/2007 | Daum et al. | 713/181 |
| 7,272,728 B2 | 9/2007 | Pierson et al. | |
| 7,305,562 B1 | 12/2007 | Bianco et al. | |
| 7,310,813 B2 | 12/2007 | Lin et al. | |
| 7,319,987 B1 | 1/2008 | Hoffman et al. | |
| 7,418,665 B2 | 8/2008 | Savage | |
| 7,590,852 B2* | 9/2009 | Hatter et al. | 713/176 |
| 7,819,322 B2 | 10/2010 | Hammad et al. | |
| 7,836,121 B2 | 11/2010 | Elgressy et al. | |
| 8,171,287 B2 | 5/2012 | Villela | |
| 8,181,032 B2* | 5/2012 | Prakash et al. | 713/186 |
| 8,205,795 B2* | 6/2012 | Kurasaki et al. | 235/380 |
| 8,327,448 B2 | 12/2012 | Eldar et al. | |
| 8,484,705 B2* | 7/2013 | Hoppe et al. | 726/6 |
| 8,667,265 B1 | 3/2014 | Hamlet et al. | |
| 2002/0065097 A1 | 5/2002 | Brockenbrough et al. | |
| 2002/0091937 A1 | 7/2002 | Ortiz | |
| 2002/0112186 A1* | 8/2002 | Ford et al. | 713/201 |
| 2002/0116616 A1 | 8/2002 | Mi et al. | |
| 2002/0178366 A1* | 11/2002 | Ofir | 713/182 |
| 2002/0181747 A1 | 12/2002 | Topping | |
| 2003/0001721 A1* | 1/2003 | Daum et al. | 340/5.8 |
| 2003/0056107 A1 | 3/2003 | Cammack et al. | |
| 2003/0061518 A1 | 3/2003 | Yamaguchi et al. | |
| 2003/0065918 A1 | 4/2003 | Willey | |
| 2003/0074568 A1 | 4/2003 | Kinsella et al. | |
| 2003/0097331 A1 | 5/2003 | Cohen | |
| 2003/0120920 A1* | 6/2003 | Svensson | 713/168 |
| 2003/0156719 A1 | 8/2003 | Cronce et al. | |
| 2003/0159044 A1* | 8/2003 | Doyle et al. | 713/176 |
| 2003/0182428 A1 | 9/2003 | Li et al. | |
| 2004/0003228 A1* | 1/2004 | Fehr et al. | 713/155 |
| 2004/0010685 A1 | 1/2004 | Sakaguchi et al. | |
| 2004/0026496 A1* | 2/2004 | Zuili | 235/379 |
| 2004/0030912 A1 | 2/2004 | Merkle et al. | |
| 2004/0049685 A1 | 3/2004 | Jaloveczki | |
| 2004/0107360 A1 | 6/2004 | Herrmann et al. | |
| 2004/0117321 A1 | 6/2004 | Sancho | |
| 2004/0143746 A1 | 7/2004 | Ligeti et al. | |
| 2004/0149820 A1* | 8/2004 | Zuili | 235/384 |
| 2004/0153483 A1* | 8/2004 | Cox | 707/206 |
| 2004/0172531 A1 | 9/2004 | Little et al. | |
| 2004/0172558 A1 | 9/2004 | Callahan et al. | |
| 2004/0177255 A1 | 9/2004 | Hughes | |
| 2004/0187018 A1 | 9/2004 | Owen et al. | |
| 2005/0018687 A1* | 1/2005 | Cutler | 370/395.2 |
| 2005/0034115 A1 | 2/2005 | Carter et al. | |
| 2005/0166263 A1 | 7/2005 | Nanopoulos et al. | |
| 2005/0182732 A1 | 8/2005 | Miller et al. | |
| 2005/0268087 A1 | 12/2005 | Yasuda et al. | |
| 2006/0005237 A1 | 1/2006 | Kobata et al. | |
| 2006/0036766 A1 | 2/2006 | Baupin et al. | |
| 2006/0080534 A1 | 4/2006 | Yeap et al. | |
| 2006/0085310 A1 | 4/2006 | Mylet et al. | |
| 2006/0090070 A1 | 4/2006 | Bade et al. | |
| 2006/0115082 A1 | 6/2006 | Kevenaar et al. | |
| 2006/0161914 A1 | 7/2006 | Morrison et al. | |
| 2006/0168580 A1 | 7/2006 | Harada et al. | |
| 2006/0248600 A1 | 11/2006 | O'Neill | |
| 2006/0265446 A1 | 11/2006 | Elgressy et al. | |
| 2007/0050850 A1 | 3/2007 | Katoh et al. | |
| 2007/0061566 A1 | 3/2007 | Bailey et al. | |
| 2007/0078785 A1 | 4/2007 | Bush et al. | |
| 2007/0094715 A1* | 4/2007 | Brown et al. | 726/5 |
| 2007/0113090 A1 | 5/2007 | Villela | |
| 2007/0124689 A1 | 5/2007 | Weksel | |
| 2007/0126550 A1 | 6/2007 | Richardson | |
| 2007/0143408 A1 | 6/2007 | Daigle | |
| 2007/0143838 A1 | 6/2007 | Milligan et al. | |
| 2007/0174633 A1 | 7/2007 | Draper et al. | |
| 2007/0198850 A1 | 8/2007 | Martin et al. | |
| 2007/0207780 A1 | 9/2007 | McLean | |
| 2007/0209064 A1 | 9/2007 | Qin et al. | |
| 2007/0214093 A1 | 9/2007 | Colella | |
| 2007/0219917 A1 | 9/2007 | Liu et al. | |
| 2007/0234409 A1 | 10/2007 | Eisen | |
| 2007/0260883 A1 | 11/2007 | Giobbi et al. | |
| 2008/0010673 A1 | 1/2008 | Makino et al. | |
| 2008/0028455 A1* | 1/2008 | Hatter et al. | 726/10 |
| 2008/0052775 A1 | 2/2008 | Sandhu et al. | |
| 2008/0104683 A1 | 5/2008 | Nagami et al. | |
| 2008/0120195 A1 | 5/2008 | Shakkarwar | |
| 2008/0120707 A1 | 5/2008 | Ramia | |
| 2008/0152140 A1 | 6/2008 | Fascenda | |
| 2008/0177997 A1 | 7/2008 | Morais et al. | |
| 2008/0226142 A1 | 9/2008 | Pennella et al. | |
| 2008/0242405 A1 | 10/2008 | Chen et al. | |
| 2008/0261562 A1 | 10/2008 | Jwa et al. | |
| 2008/0268815 A1 | 10/2008 | Jazra et al. | |
| 2008/0276321 A1 | 11/2008 | Svancarek et al. | |
| 2008/0289025 A1 | 11/2008 | Schneider | |
| 2009/0019536 A1 | 1/2009 | Green et al. | |
| 2009/0083833 A1 | 3/2009 | Ziola et al. | |
| 2009/0101707 A1* | 4/2009 | Kurasaki et al. | 235/380 |
| 2009/0113088 A1 | 4/2009 | Illowsky et al. | |
| 2009/0132813 A1 | 5/2009 | Schibuk | |
| 2009/0138643 A1 | 5/2009 | Charles et al. | |
| 2009/0198618 A1 | 8/2009 | Chan et al. | |
| 2009/0271851 A1* | 10/2009 | Hoppe et al. | 726/6 |
| 2009/0287938 A1* | 11/2009 | Prakash et al. | 713/186 |
| 2009/0300744 A1 | 12/2009 | Guo et al. | |
| 2010/0197293 A1* | 8/2010 | Shem-Tov | 455/420 |
| 2010/0306038 A1 | 12/2010 | Harris | |
| 2011/0093943 A1* | 4/2011 | Nakagawa et al. | 726/9 |
| 2011/0244829 A1 | 10/2011 | Kase | |
| 2011/0271109 A1* | 11/2011 | Schilling et al. | 713/168 |
| 2012/0030771 A1 | 2/2012 | Pierson et al. | |
| 2012/0284499 A1* | 11/2012 | Prakash et al. | 713/2 |
| 2013/0031619 A1* | 1/2013 | Waltermann et al. | 726/8 |
| 2013/0174231 A1 | 7/2013 | Stavropoulos et al. | |
| 2013/0183936 A1* | 7/2013 | Smtih et al. | 455/411 |

FOREIGN PATENT DOCUMENTS

| | | |
|---|---|---|
| EP | 2282474 | 2/2011 |
| EP | 2312483 | 4/2011 |
| GB | 2355322 | 4/2001 |
| WO | WO 92/09160 | 5/1992 |
| WO | WO 00/58895 | 10/2000 |
| WO | WO 01/90892 | 11/2001 |
| WO | WO 03/032126 | 4/2003 |
| WO | WO 2004/054196 | 6/2004 |
| WO | WO 2005/104686 | 11/2005 |
| WO | WO 2008/013504 | 1/2008 |
| WO | WO 2008/127431 | 10/2008 |

OTHER PUBLICATIONS

Pottie et al.; Wireless integrated network sensors;Published in: Magazine Communications of the ACM CACM Homepage archive; vol. 43 Issue 5, May 2000; pp. 51-58; ACM Digital Library.*

"Canon User Manual—Nikon Coolpix S52/S52c," Apr. 21, 2008, entire manual.

(56) References Cited

OTHER PUBLICATIONS

David J-L, "Cookieless Data Persistence in Possible," Apr. 23, 2003, Internet Article retrieved on Sep. 21, 2010. XP002603490.

Iovation, "Using Reputation of Devices to Detect and Prevent Online Retail Fraud," White Paper, Apr. 2007.

Iovation, "Controlling High Fraud Risk of International Transactions," Iovation Reputation Services, White Paper, May 2007.

Jensen et al., "Assigning and Enforcing Security Policies on Handheld Devices," 2002, 8 pages.

Johnson et al. "Dynamic Source Routing in Ad Hoc Wireless Networks," Mobile Computing, Kluwer Academic Publishers, 1996.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Wikipedia: "Software Extension," May 28, 2009, Internet Article retrieved on Oct. 11, 2010. XP002604710.

Posting from Slashdot on the article "Smart Cards for Windows XP Login" Comment "Re: PIN" posted Dec. 3, 2001. http://en.wikipedia.org/w/index.php?title=Two-factor_authentication&ildid=216794321.

* cited by examiner

DEVICE AUTHENTICATION USING DEVICE ENVIRONMENT INFORMATION

This application claims priority to U.S. Provisional Application 61/780,289, which was filed Mar. 13, 2013, and which is fully incorporated herein by reference.

BACKGROUND OF THE INVENTION

1. Field of the Invention

The present invention relates generally to network-based computer security and, more particularly, methods of and systems for authenticating a device for computer network security.

2. Description of the Related Art

Device identification through device keys, i.e., though a collection of hardware and system configuration attributes, has proven to be invaluable in recent years to such technologies as security and digital rights management. In security, authentication of a person can be restricted to a limited number of previously authorized devices that are recognized by their device keys. In digital rights management, use of copyrighted or otherwise proprietary subject matter can be similarly restricted to a limited number of previously authorized devices that are recognized by their device keys.

Device keys, sometimes referred to as digital fingerprints, should be globally unique and difficult to spoof. Accordingly, IP and MAC addresses make insecure identifiers. In addition, some operating systems limit access to device configuration details, making derivation of a globally unique identifiers of a large population of similar devices particularly challenging.

What is needed is a way to identify and authenticate a device using information of the device that is highly likely to be unique and is accessible to user space applications.

SUMMARY OF THE INVENTION

In accordance with the present invention, a device authentication server authenticates a remotely located device using a detailed history of movement of the device. Such movement history is represented by data representing a history of the external state of the device within a physical environment, examples of which include accelerometer logs, orientation logs, and magnetic field logs.

For example, acceleration of the device through space represents rates of change of velocity of the device through space, which in turn is a measure of rates of change of the position of the device in space. Position, velocity, and acceleration of the device in and through space are external states of the device as "external state" is used herein. Orientation of the device is a measure of the angular deviation of the device the device from perfectly flat (display screen parallel to the surface of the earth) with the top pointed toward magnetic North. Such orientation is an external state of the device. In addition, the external state of the device includes the earth's magnetic field at the physical location of the device measured across three dimensions of device 102: x-, y-, and z-axes.

All of these external states of the device are direct or indirect results of external forces being applied to the device, such as being physically carried by a person, being transported in a vehicle, or being acted upon by gravity and a physical collision with an immovable object at the end of a fall, for example. For example, physically carrying the device causes (i) acceleration of device as the device is accelerated to move through space and eventually decelerated to stop, (ii) changes in orientation of the device unless extreme care is taken to avoid even minute changes in the orientation of the device (entirely impractical if carried by a person), and (iii) changes in the earth's magnetic field across the three axes of the device as the physical location and orientation of the device changes.

Data representing these external states of the device is recorded in various logs, including an accelerometer log, an orientation log, and a magnetic field log, for example. These logs represent a history of external states of the device as the device has moved through physical space. The manner in which the device moves through physical space is even more unique than the user of the device herself since each movement of the device is likely to be unique, even if the same user moves the device attempts to move the device exactly the same. Thus, the history of external states of the device is highly likely to be unique among very large populations of devices.

For subsequent authentication of the device, the device provides the device authentication server with a history of external states, sometimes reference to as device environmental data, of the device to store and use subsequently as reference device environmental data.

In subsequent authentication of the device, the device authentication server sends a device key challenge to the device. The device key challenge specifies a randomized selection of device attribute parts to be collected from the device and the manner in which the device attribute parts are to be combined to form a device key. The device key is data that identifies and authenticates the device and includes a device identifier and device environmental data.

The device authentication server authenticates the device when the device identifier of the device key identifies the device and the device environmental data is consistent with the reference device environmental data.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

In accordance with the present invention, a device authentication server 108 (FIG. 1) authenticates a computing device 102 using a detailed history of movement of device 102. Such movement history is represented by data representing a history of the external state of device 102 within a physical environment, examples of which include accelerometer logs, orientation logs, and magnetic field logs.

As used herein, an external state is independent of any state within a device but is limited to aspects of the physical environment that is external to device 102. For example, acceleration of device 102 through space represents rates of change of velocity of device 102 through space, which in turn is a measure of rates of change of the position of device 102 in space. Position, velocity, and acceleration of device 102 in and through space are external states of device 102 as "external state" is used herein. Orientation of device 102 is a measure of the angular deviation of device 102 from perfectly flat (display screen parallel to the surface of the earth) with the top pointed toward magnetic North. Such orientation is an external state of device 102. In addition, the external state of device 102 includes the earth's magnetic field at the physical location of device 102 measured across three dimensions of device 102: x-, y-, and z-axes. All of these external states of device 102 are direct or indirect results of external forces being applied to device 102, such as being physically carried by a person, being transported in a vehicle, or being acted upon by gravity and a physical collision with an immovable object at the end of a fall, for example. For example, physically carrying device 102 causes (i) acceleration of device as device 102 is accelerated to move through space and eventually decelerated to stop, (ii) changes in orientation of device 102 unless extreme care is taken to avoid even minute changes in the orientation of device 102 (entirely impractical if carried by a person), and (iii) changes in the earth's magnetic field across the three axes of device 102 as the physical location and orientation of device 102 changes.

In this illustrative embodiment, device 102 is a mobile device that includes accelerometers 1114 (FIG. 11), orientation sensors 1116, and magnetic field sensors 1118. Acceleration measured by accelerometers 1114 is recorded in an accelerometer log 1150. Orientation measured by orientation sensors 1116 is recorded in an orientation log 1152. Magnetic fields measured by magnetic field sensors 1118 are recorded in a magnetic field log 1154.

Accelerometers 1214, orientation sensors 1216, and magnetic field sensors 1218 can measure their respective environmental states at rates of 100 MHz or more. Accordingly, a large amount of data can be gathered relatively quickly. In addition, the manner in which device 102 moves through its environment is even more unique than the user of device 102 herself since each movement of device 102 is likely to be unique, even if the same user moves device 102 attempts to move device 102 exactly the same. Thus, the environmental data stored in accelerometer log 1150, orientation log 1152, and magnetic field log 1154 is highly likely to be unique among very large populations of devices.

Device authentication system 100 (FIG. 1) includes device 102, a server 106, and device authentication server 108 that are connected to one another through a wide area computer network 104, which is the Internet in this illustrative embodiment. Device 102 can be any of a number of types of networked computing devices, including smart phones, tablets, netbook computers, laptop computers, and desktop computers. Server 106 is a server that provides services to remotely located devices such as device 102 but that is configured to require authentication of device 102 prior to providing those services. Device authentication server 108 is a server that authenticates devices, sometimes on behalf of other computers such as server 106.

Device attributes are described briefly to facilitate understanding and appreciation of the present invention. In this illustrative embodiment, logged environmental data of device 102 is combined with other attributes of device 102 to form a digital fingerprint of device 102. Such other attributes include hardware and system configuration attributes of device 102 that make up an internal state of device 102. Known device record 500 (FIG. 5) includes device attributes 504, both of which are described in greater detail below. Each device attribute 504 includes an identifier 506 and a value 508. Other than logged environmental data, examples of device attributes of device 102 include a serial number of a storage device within device 102 and detailed version information regarding an operating system executing within device 102. In the example of a serial number of a storage device, identifier 506 specifies the serial number of a given storage device (such as "C:" or "/dev/sda1") as the particular information to be stored as value 508, and value 508 stores the serial number of the given storage device of device 102.

For subsequent authentication of device 102, registration in the manner illustrated in transaction flow diagram 200 (FIG. 2) retrieves logged environmental data from device 102.

Figure 2:
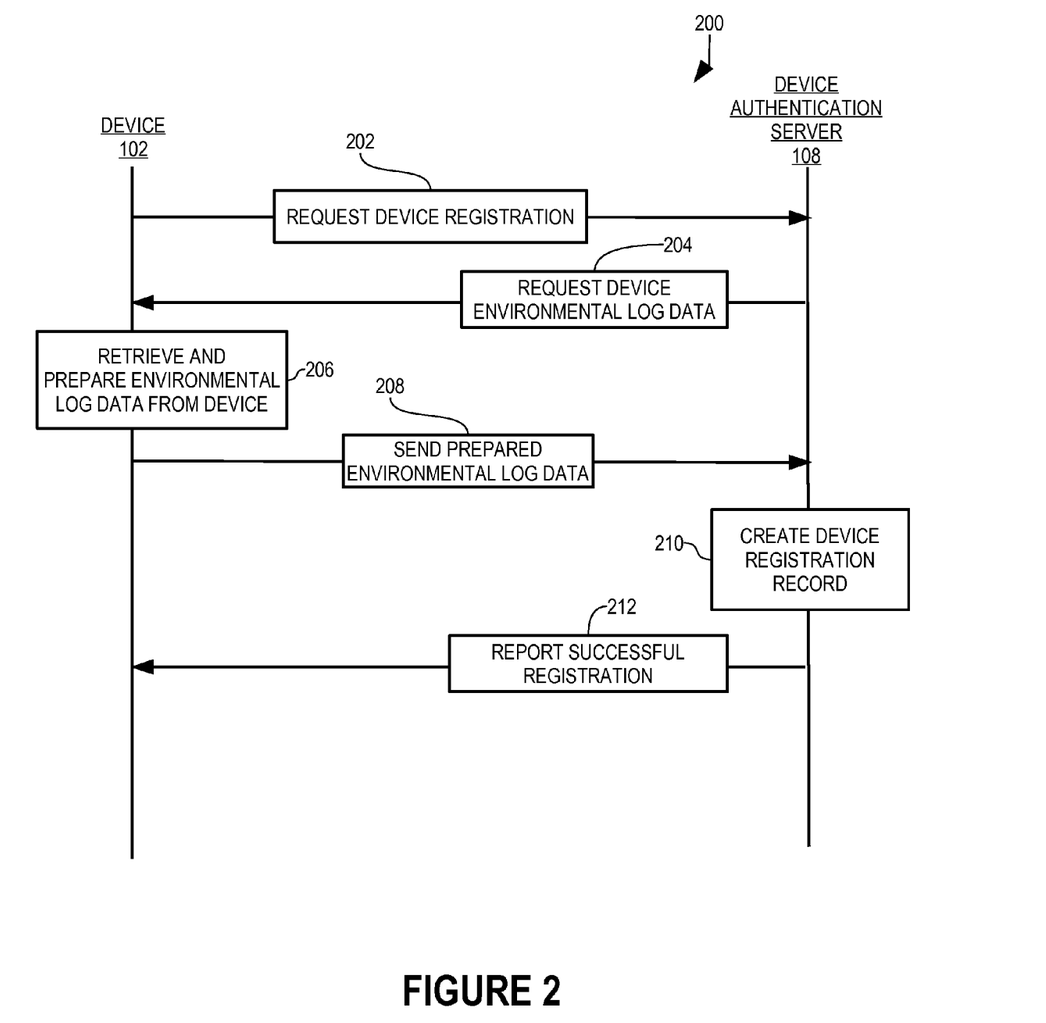
FIG. 2 is a transaction flow diagram illustrating the manner in which the device is registered with the device authentication server for subsequent authentication.

In step 202, device 102 sends a request for registration to device authentication server 108. The request can be in the form of a URL specified by the user of device 102 using a web browser 1120 (FIG. 11) executing in device 102 and conventional user interface techniques involving physical manipulation of user input devices 1108. Web browser 1120 and user input devices 1108 and other components of device 102 are described in greater detail below.

In step 204 (FIG. 2), device authentication server 108 sends a request to device 102 for device attributes of device 102.

The request sent to device 102 includes content that causes web browser 1120 (FIG. 11) of device 102 to gather attribute data representing hardware and other configuration attributes of device 102. In one embodiment, a web browser plug-in 1122 is installed in device 102 and, invoked by web browser 1120, processes the content of the web page to gather the attribute data in step 206. In other embodiments, the attribute data can be gathered by other forms of logic of device 102, such as DDK generator 1140 installed in device 102. The various elements of device 102 and their interaction are described more completely below.

The content that causes web browser 1120 (FIG. 11) of device 102 to gather attribute data representing hardware and other configuration attributes of device 102 includes extraction logic 510 (FIG. 5) for each of the attributes web browser 1120 (FIG. 11) is to gather. In an alternative embodiment, DDK generator 1140 already includes extraction logic for all attributes and device 102 receives data identifying the particular attributes requested by device authentication server 108. Extraction logic 510 (FIG. 5) defines the manner in which a client device is to extract data to be stored as value 508 of device attribute 504.

Figure 7:
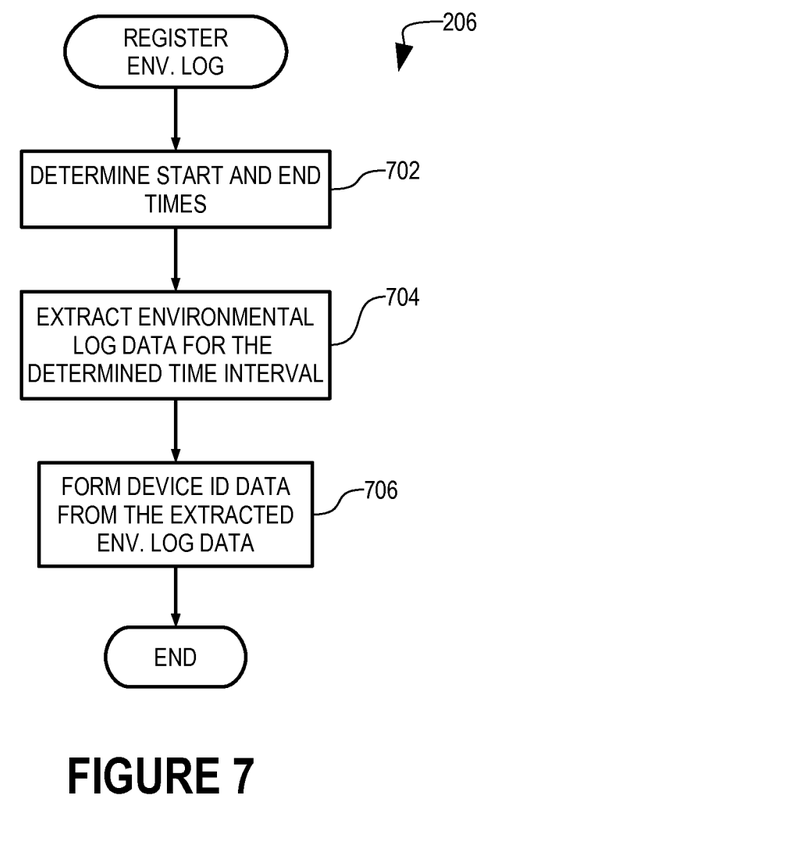
FIG. 7 is a logic flow diagram illustrating the extraction of logged environmental data for registration of the device.

Step 206 for gathering attribute data regarding logged environmental data is shown in greater detail as logic flow diagram 206 (FIG. 7). In step 702, device 102 determines start and end times for logged environmental data to be collected.

Figure 4:
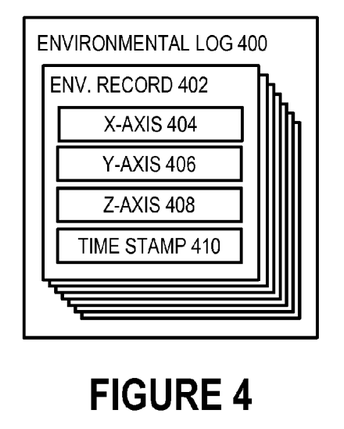
FIG. 4 is a block diagram of a log of environmental data to be used for authentication of the device of FIG. 1.

Each of accelerometer log 1150 (FIG. 11), orientation log 1152, and magnetic field log 1154 are generally of the form of environmental log 400 (FIG. 4). Environmental log 400 includes a number of environmental records 402, each representing a measured environmental state of device 102. X-axis 404, y-axis 406, and z-axis 408 represent the measured environmental state of device 102 along the x-axis, y-axis, and z-axis, respectively, of device 102. In the case of accelerometer log 1150, x-axis 404 represents measured acceleration of device 102 along the horizontal dimension of device 102, y-axis 406 represents measured acceleration of device 102 along the vertical dimension of device 102, and z-axis 408 represents measured acceleration of device 102 along a line perpendicular to the display of device 102.

Time stamp 410 specifies the time at which the measurements of environmental record 402 were captured. The start and end times determined by device 102 in step 702 (FIG. 7) specify which of environmental records 402 (FIG. 4) are to be collected for each of accelerometer log 1150 (FIG. 11), orientation log 1152, and magnetic field log 1154. In one embodiment, device 102 determines that the start time is the very first available environmental record 402 and that the end time is the current time, retrieving the entirety of all logs. In other embodiments, device 102 can determine that the start and end times represent a more limited amount of time, such as the first month of logged environmental data available or the most recent week as examples. In some embodiments, logged environmental data might not be available. In such cases, device 102 creates accelerometer log 1150 (FIG. 11), orientation log 1152, and magnetic field log 1154 by monitoring accelerometers 1114, orientation sensors 1116, and magnetic field sensors 1118, respectively, for a period of time.

In step 704 (FIG. 7), device 102 extracts the logged environmental data for the interval of time determined in step 702.

In step 706, device 102 forms a device identifier from the extracted logged environmental data. In this illustrative embodiment, device 102 forms the device identifier from the extracted logged environmental data in combination with other device attribute data. The device identifier can be a hash of all, or selected parts, of collected device attributed data, for example. After step 706, processing according to logic flow diagram 206, and therefore step 206 (FIG. 2), completes.

In this illustrative embodiment, device 102—in particular, web browser plug-in 1122 (FIG. 11) or DDK generator 1140—encrypts the attribute data using a public key of device authentication server 108 and public key infrastructure (PKI), thereby encrypting the attribute data such that it can only be decrypted by device authentication server 108.

In step 208 (FIG. 2), device 102 sends the attribute data that was gathered in step 206 to device authentication server 108.

In step 210, device authentication logic 1020 (FIG. 10) of device authentication server 108 creates a device registration record for device 102 from the received attribute data. Device authentication server 108 creates a device registration record in the form of known device record 500 (FIG. 5) for device 102 by creating a globally unique identifier for device 102, or using the identifier formed by device 102 in step 806 (FIG. 8), as device identifier 502 (FIG. 5) and storing the values of the respective attributes, including the logged environmental data, received in step 208 (FIG. 2) as value 508 (FIG. 5) in respective device attributes 504. Known device record 500 is described more completely below in greater detail.

In step 212 (FIG. 2), device authentication server 108 sends a report of successful registration to device 102, providing device identifier 502 (FIG. 5) of device 102 for subsequent identification, particularly if it differs from the one generated by device 102. After step 212 (FIG. 2), processing according to transaction flow diagram 200 completes and device 102 is registered for subsequent authentication with device authentication server 108.

Known device record 500 (FIG. 5) is a registration record and, in this illustrative example, represents registration of device 102. Known device record 500 includes a device identifier 502 and a number of device attributes 504 which are described briefly above. Each device attribute 504 includes an identifier 506 specifying a particular type of information and a value 508 representing the particular value of that type of information from device 102. For example, if identifier 506 specifies a serial number of a given storage device, value 514 stores the serial number of that storage device within device 102. Similarly, if identifier 506 specifies an accelerometer log, an orientation log, or a magnetic field log of a given storage device, value 508 stores data representing represents the proper environmental log.

In this illustrative embodiment, value 508 stores the appropriate log data in the form of environmental log 400. In alternative embodiments, value 508 can store an abstraction of the log data. For example, value 508 can store a hash of the log data. Alternatively, value 508 can store data representing the total distance device 102 has moved using accelerometer log data, the cumulative angle of rotation of device 102 using orientation log data, and the cumulative change in magnetic field of device 102 using the magnetic field data.

Device attribute 504 (FIG. 5) also includes extraction logic 510, comparison logic 512, alert logic 514, and adjustment logic 516. The particular device attribute represented by device attribute 504 is sometimes referred to as "the subject device attribute" in the context of FIG. 5.

Extraction logic 510 specifies the manner in which the subject device attribute is extracted by device 102. Logic flow diagram 206 (FIG. 7) is an example of extraction logic 510 for environmental log data.

Comparison logic 512 specifies the manner in which the subject device attribute is compared to a corresponding device attribute to determine whether device attributes match one another. For example, if environmental log data is gathered with a specific time range, the comparison can be equivalence of the environmental log data received for authentication with that stored in value 508 for the specific time range. If the environmental log data is gathered in its entirety and represented as a cumulative change in state, the environmental log data received for authentication should be greater that stored in value 508 by an amount roughly predicted by the rate of change in the state over time.

Alert logic 514 can specify alerts of device matches or mismatches or other events. Examples of alert logic 514 include e-mail, SMS messages, and such to the owner of device 102 and/or to a system administrator responsible for proper functioning of device 102.

Adjustment logic 516 specifies the manner in which the subject device attribute is to be adjusted after authentication. For example, if the environmental log data received for authentication includes environmental log data that is not already stored in value 508, adjustment logic 516 can cause value 508 to be updated to include the additional environmental log data. Similarly, if the environmental log data received for authentication is a cumulative representation of the environmental log data, adjustment logic 516 can cause value 508 to be updated to include the newly received cumulative representation.

Device attribute 504 is shown to include the elements previously described for ease of description and illustration. However, it should be appreciated that a device attribute 504 for a given device can include only identifier 506 and value 508, while a separate device attribute specification can include extraction logic 510, comparison logic 512, alert logic 514, and adjustment logic 516. In addition, all or part of extraction logic 510, comparison logic 512, alert logic 514, and adjustment logic 516 can be common to attributes of a given type and can therefore be defined for the given type.

Transaction flow diagram 300 (FIG. 3) illustrates the use of device authentication server 108 to authenticate device 102 with server 106.

Figure 3:
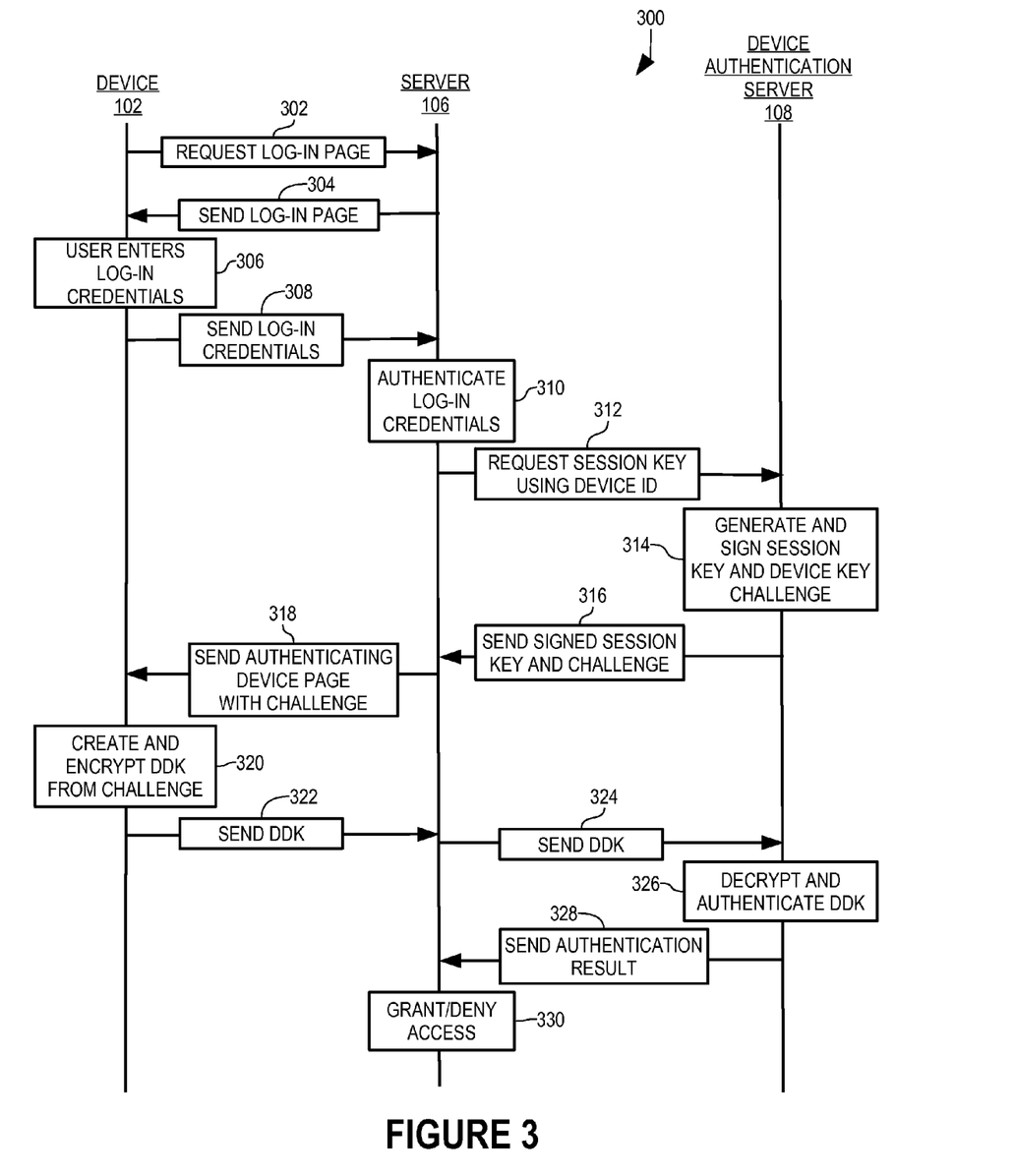
FIG. 3 is a transaction flow diagram illustrating the manner in which the device, the server, and the device authentication server of FIG. 1 cooperate to authenticate the device.

In step 302, device 102 sends a request for a log-in web page to server 106 by which the user can authenticate herself. The request can be in the form of a URL specified by the user of device 102 using web browser 1120 (FIG. 11) and conventional user interface techniques involving physical manipulation of user input devices 1108.

In step 304 (FIG. 3), server 106 sends the web page that is identified by the request received in step 302. In this illustrative example, the web page sent to device 102 includes content that defines a user interface by which the user of device 102 can enter her authentication credentials, such as a user name and associated password for example.

In step 306, web browser 1120 (FIG. 11) of device 102 executes the user interface and the user of device 102 enters her authentication credentials, e.g., by conventional user interface techniques involving physical manipulation of user input devices 1108. While the user is described as authenticating herself in this illustrative example, it should be appreciated that device 102 can be authenticated without also requiring that the user of device 102 is authenticated.

In step 308 (FIG. 3), device 102 sends the entered authentication credentials to server 106. In this illustrative embodiment, device 102 also sends an identifier if itself along with the authentication credentials. Server 106 authenticates the authentication credentials in step 310, e.g., by comparison to previously registered credentials of known users. If the credentials are not authenticated, processing according to transaction flow diagram 300 terminates and the user of device 102 is denied access to services provided by server 106. Conversely, if server 106 determines that the received credentials are authentic, processing according to transaction flow diagram 300 continues.

In step 312 (FIG. 3), server 106 sends a request to device authentication server 108 for a session key using the device identifier received with the authentication credentials.

In response to the request, device authentication server 108 generates and cryptographically signs a session key. Session keys and their generation are known and are not described herein. In addition, device authentication server 108 creates a device key challenge and encrypts the device key challenge using a public key of device 102 and PKI.

To create the device key challenge, device authentication server 108 retrieves the known device record 500 (FIG. 5) representing device 102 using the received device identifier and comparing it to device identifier 502. The device key challenge specifies all or part of one or more of device attribute 504 to be included in the device key and is described in greater detail below.

In step 316 (FIG. 3), device authentication server 108 sends the signed session key and the encrypted device key challenge to server 106.

In step 318, server 106 sends a "device authenticating" page to device 102 along with the device key challenge. The "device authenticating" page includes content that provides a message to the user of device 102 that authentication of device 102 is underway and content that causes device 102 to produce a dynamic device key in the manner specified by the device key challenge.

The device key challenge causes web browser 1120 (FIG. 11) of device 102 to generate a device identifier, sometimes referred to herein as a dynamic device key (DDK) for device 102, e.g., dynamic device key 1142. In one embodiment, a web browser plug-in 1122 is installed in client device 102 and, invoked by web browser 1120, processes the content of the web page to generate the DDK. In other embodiments, DDK 1142 of device 102 can be generated by other forms of logic of device 102, such as DDK generator 1140, which is a software application installed in device 102.

Figure 5:
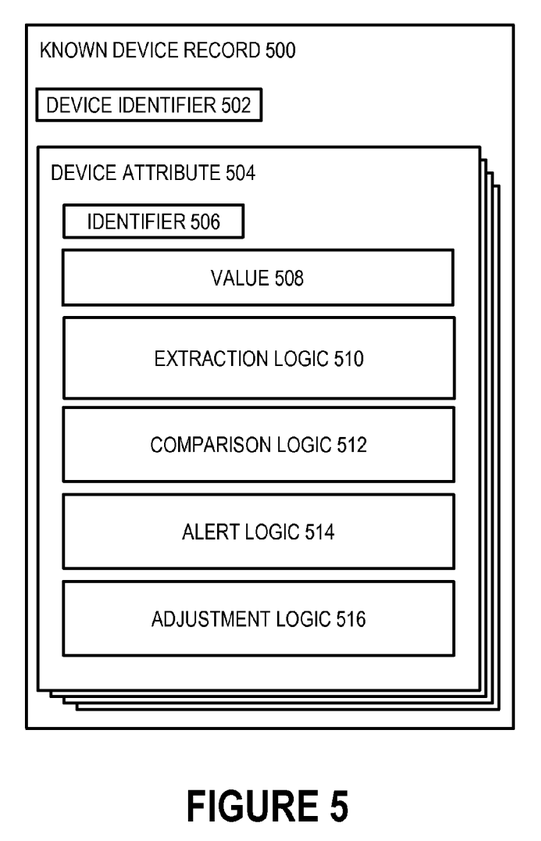
FIG. 5 is a block diagram of a known device record used by the device authentication server to authenticate the device.

The device key challenge specifies the manner in which DDK 1142 is to be generated from the attributes of device 102 represented in device attributes 504 (FIG. 5). The challenge specifies a randomized sampling of attributes of device 102, allowing the resulting DDK 1142 to change each time device 102 is authenticated. There are a few advantages to having DDK 1142 represent different samplings of the attributes of device 102. One is that any data captured in a prior authentication of device 102 cannot be used to spoof authentication of device 102 using a different device when the challenge has changed. Another is that, since only a small portion of the attributes of device 102 are used for authentication at any time, the full set of attributes of device 102 cannot be determined from one, a few, several, or even many authentications of device 102.

The device key challenge specifies items of information to be collected from hardware and system configuration attributes of device 102 and the manner in which those items of information are to be combined to form DDK 1142. In this embodiment, the challenge specifies one or more attributes related to logged environmental data of device 102, e.g., accelerometer log 1150, orientation log 1152, and/or magnetic field log 1154.

The device key challenge can specify multiple parts of a device attribute to include in the device key. For example, the device key challenge can specify that the total distance device 102 moved in the month of February and the first quarter of the year (including February twice) is to be derived from accelerometer log data and included in the device key. Similarly, the device key challenge can specify that orientation log data from orientation log 1152 for five small time intervals randomly selected from the entirety of orientation log 1152.

To provide greater security, DDK 1142 includes data representing the logged environmental data obfuscated using a nonce included in the challenge. While use of randomized parts of the logged environmental data precludes capture of any single DDK to be used in subsequent authentication, use of the nonce thwarts collection of randomized parts of the logged environmental data over time to recreate enough of environmental log 400 (FIG. 4) to spoof authentication in response to a given challenge.

Figure 8:
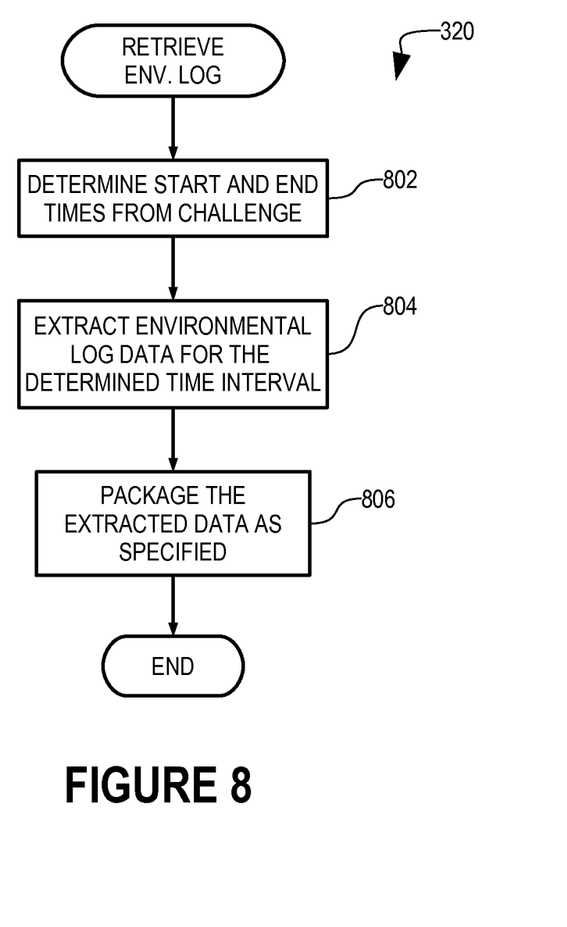
FIG. 8 is a logic flow diagram illustrating the extraction of logged environmental data in response to a device key challenge for authentication of the device.

In step 320 (FIG. 3), device 102 gathers logged environmental data for inclusion in the DDK according to the device key challenge. Step 320 is shown in greater detail as logic flow diagram 320 (FIG. 8).

In step 802, device 102 determines start and end times for logged environmental data to be collected. The start and end times are specified in the device key challenge and the device key challenge can include multiple start/end time pairs.

In step 804 (FIG. 8), device 102 extracts the logged environmental data for the one or more intervals of time determined in step 802.

In step 806, device 102 packages the extracted logged environmental data in the manner specified in the device key challenge. As noted above, the device key challenge can specify that the an abstraction of the extracted logged environmental data, such as cumulative change in environmental state over time for example. After step 806, processing according to logic flow diagram 320, and therefore step 320 (FIG. 3), completes.

Once DDK 1142 (FIG. 11) is generated according to the received device key challenge, device 102 encrypts DDK 1142 using a public key of device authentication server 108 and PKI.

In step 322 (FIG. 3), device 102 sends the encrypted dynamic device key to server 106, and server 106 sends the encrypted dynamic device key to device authentication server 108 in step 324.

Figure 6:
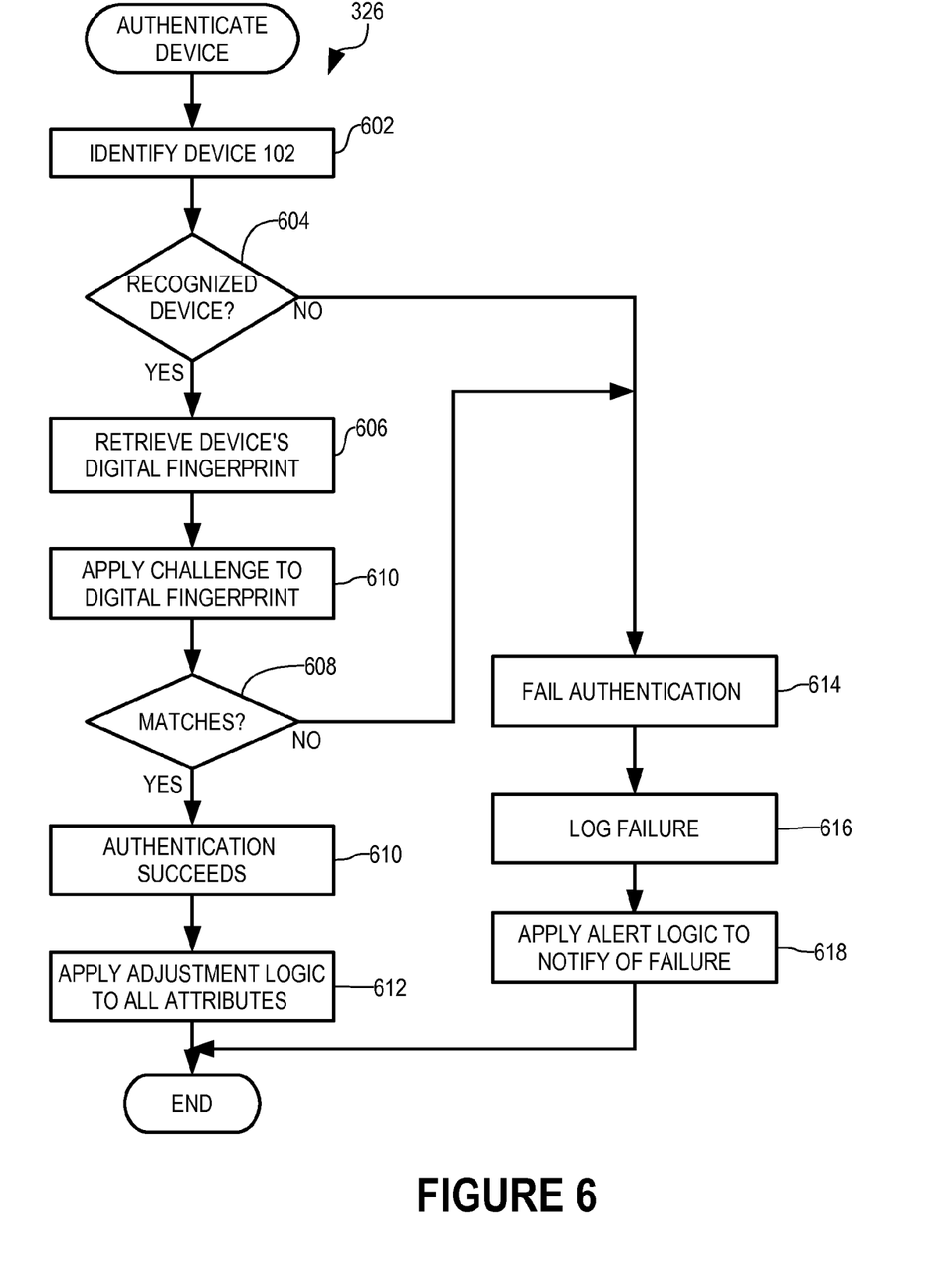
FIG. 6 is a logic flow diagram of an authentication process by which the device authentication server authenticates the device.

In step 326, device authentication logic 1020 of device authentication server 108 decrypts and authenticates the received DDK. Step 326 is shown in greater detail as logic flow diagram 326 (FIG. 6).

In step 602, device authentication logic 1020 identifies device 102. In this illustrative embodiment, the received DDK includes a device identifier corresponding to device identifier 502 (FIG. 5). Device authentication logic 1020 identifies device 102 by locating a known device record 500 in which device identifier 502 matches the device identifier of the received DDK.

In test step 604 (FIG. 6), device authentication logic 1020 determines whether device 102 is identified. In particular, device authentication logic 1020 determines whether a known device record with a device identifier matching the device identifier of the received DDK is successfully found in known device data 1030. If so, processing transfers to step 606. Otherwise, processing transfers to step 614, which is described below.

In step 606, device authentication logic 1020 authenticates the received DDK using the known device record 500 (FIG. 5) for the identified device, e.g., device 102. Device authentication logic 1020 authenticates by applying the same device key challenge sent in step 318 (FIG. 3) to the known device record 500 (FIG. 5) that corresponds to the identified device. In this illustrative embodiment, the device key challenge produces a DDK in which a portion of the DDK generated from non-interactive attributes can be parsed from a portion generated from interactive attributes, such that device 102 can be authenticated separately from the user of device 102.

In test step 608 (FIG. 6), device authentication logic 1020 determines whether the received DDK authenticates device 102 by comparing the resulting DDK of step 606 to the received DDK. In this illustrative embodiment, device authentication logic 1020 uses comparison logic 512 (FIG. 5) for each of the device attributes 504 included in the device key challenge.

If the received DDK does not authenticate device 102, processing transfers to step 614 and authentication fails or, alternatively, to step 314 (FIG. 3) in which device authentication logic 1020 sends another device key challenge to re-attempt authentication. If the received DDK authenticates device 102, processing transfers to step 610.

In step 610, device authentication logic 1020 determines that device 102 is successfully authenticated.

In test step 612 (FIG. 6), device authentication logic 1020 applies adjustment logic 516 (FIG. 5) of each of device attributes 504 uses to generate the received DDK. For example, adjustment logic 516 can specify that, if the received DDK includes logged environmental data not already included in value 508, device authentication logic 1020 incorporates the new logged environmental data into value 508. After step 612 (FIG. 6), processing according to logic flow diagram 326, and therefore step 326, completes. As described above, authentication failure at either of test steps 604 and 608 transfers processing to step 614.

In step 614, device authentication logic 1020 determines that device 102 is not authentic, i.e., that authentication according to logic flow diagram 326 fails.

In step 616, device authentication logic 1020 logs the failed authentication and, in step 618, applies alert logic 514 (FIG. 5) to notify various entities of the failed authentication. After step 618 (FIG. 6), processing according to logic flow diagram 326, and therefore step 326, completes.

In step 328 (FIG. 3), device authentication server 108 sends data representing the result of authentication of device 102 to server 106.

In step 330, server 106 determines whether to continue to interact with device 102 and in what manner according to the device authentication results received in step 328.

Figure 9:
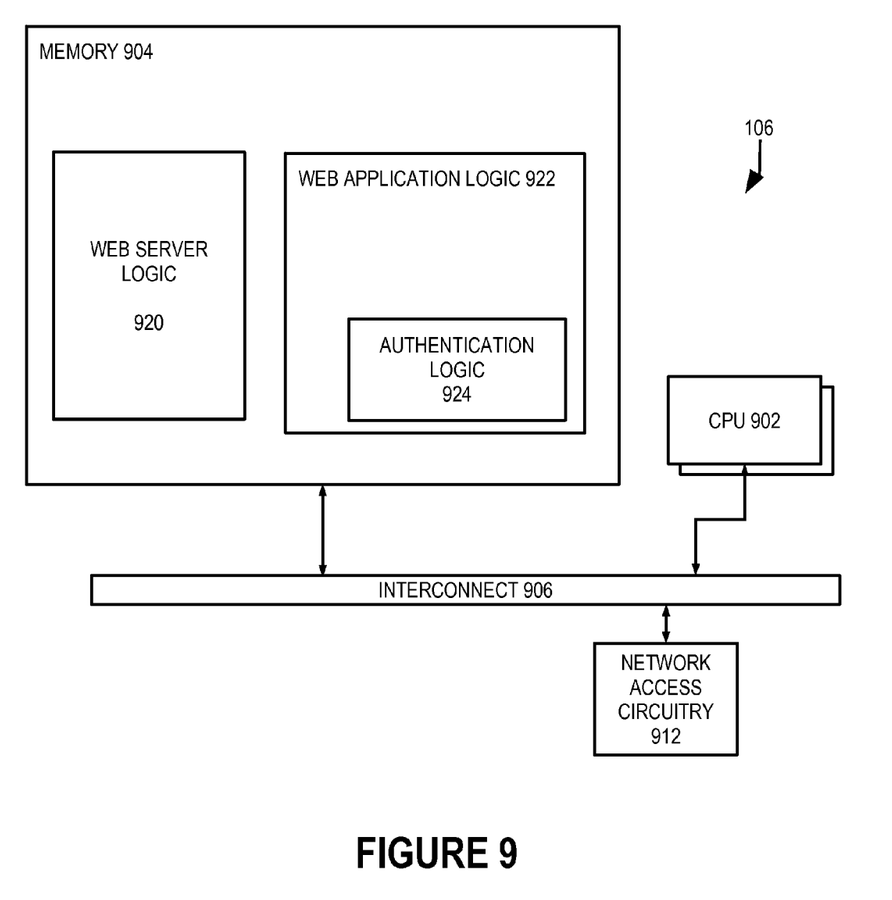
FIG. 9 is a block diagram showing in greater detail the server of FIG. 1.

Server computer 106 is shown in greater detail in FIG. 9. Server 106 includes one or more microprocessors 902 (collectively referred to as CPU 902) that retrieve data and/or instructions from memory 904 and execute retrieved instructions in a conventional manner. Memory 904 can include generally any computer-readable medium including, for example, persistent memory such as magnetic and/or optical disks, ROM, and PROM and volatile memory such as RAM.

Figure 1:
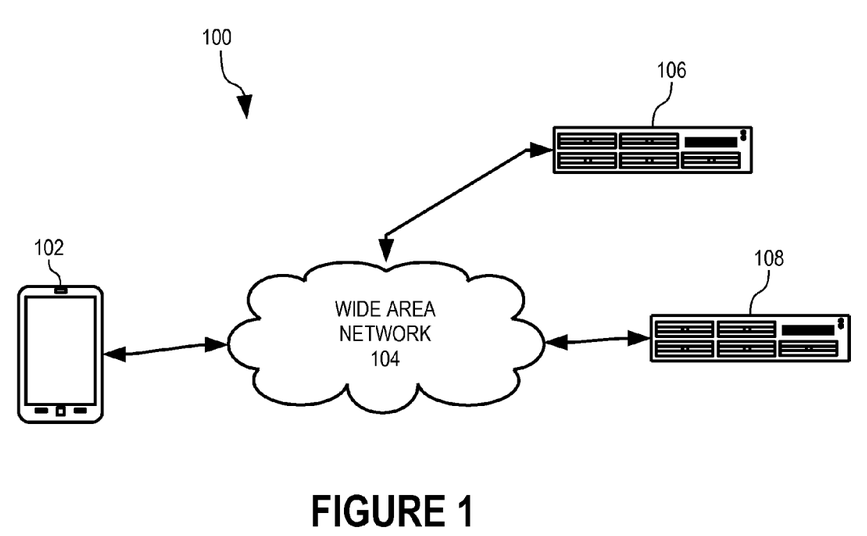
FIG. 1 is a diagram showing a computing device, a server, and a device authentication server that cooperate to identify and authenticate the device in accordance with one embodiment of the present invention.

CPU 902 and memory 904 are connected to one another through a conventional interconnect 906, which is a bus in this illustrative embodiment and which connects CPU 902 and memory 904 to network access circuitry 912. Network access circuitry 912 sends and receives data through computer networks such as wide area network 104 (FIG. 1).

A number of components of server 106 are stored in memory 904. In particular, web server logic 920 and web application logic 922, including authentication logic 924, are all or part of one or more computer processes executing within CPU 902 from memory 904 in this illustrative embodiment but can also be implemented using digital logic circuitry.

Web server logic 920 is a conventional web server. Web application logic 922 is content that defines one or more pages of a web site and is served by web server logic 920 to client devices such as device 102. Authentication logic 924 is a part of web application logic 922 that causes client devices and their users to authenticate themselves in the manner described above.

Figure 10:
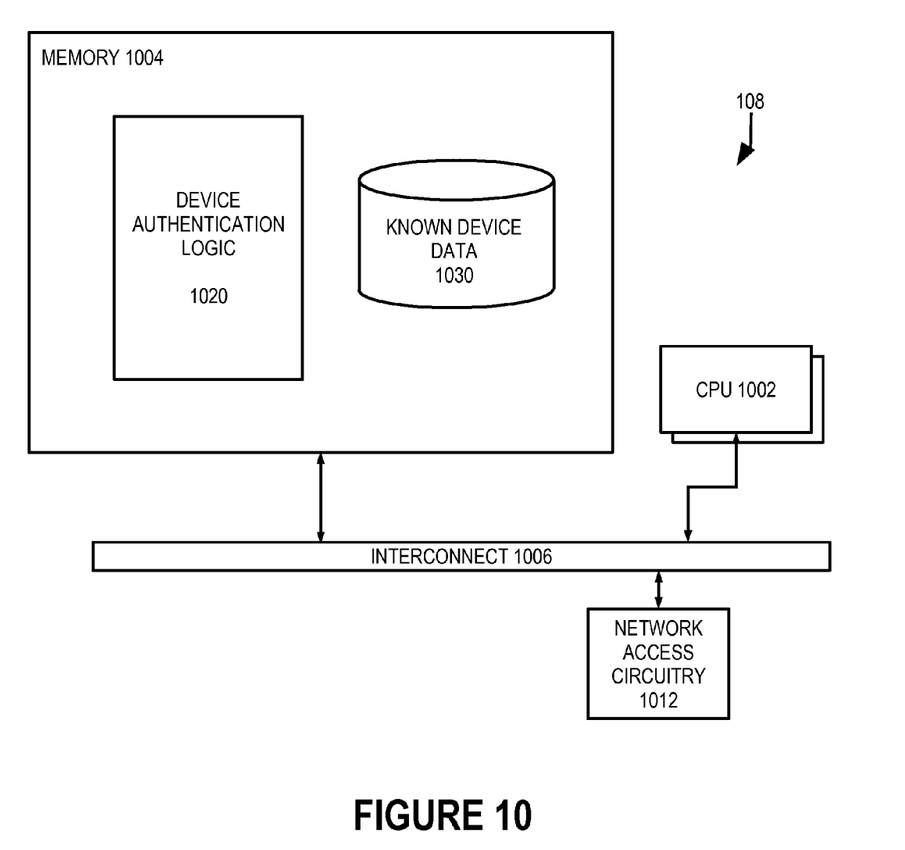
FIG. 10 is a block diagram showing in greater detail the device authentication server of FIG. 1.

Device authentication server 108 is shown in greater detail in FIG. 10. Device authentication server 108 includes one or more microprocessors 1002 (collectively referred to as CPU 1002), memory 1004, a conventional interconnect 1006, and network access circuitry 1012, which are directly analogous to CPU 902 (FIG. 9), memory 904, conventional interconnect 906, and network access circuitry 912, respectively.

A number of components of device authentication server 108 (FIG. 10) are stored in memory 1004. In particular, device authentication logic 1020 is all or part of one or more computer processes executing within CPU 1002 from memory 1004 in this illustrative embodiment but can also be implemented using digital logic circuitry. Known device data 1030 is data stored persistently in memory 1004. In this illustrative embodiment, known device data 1030 is organized as all or part of one or more databases.

Figure 11:
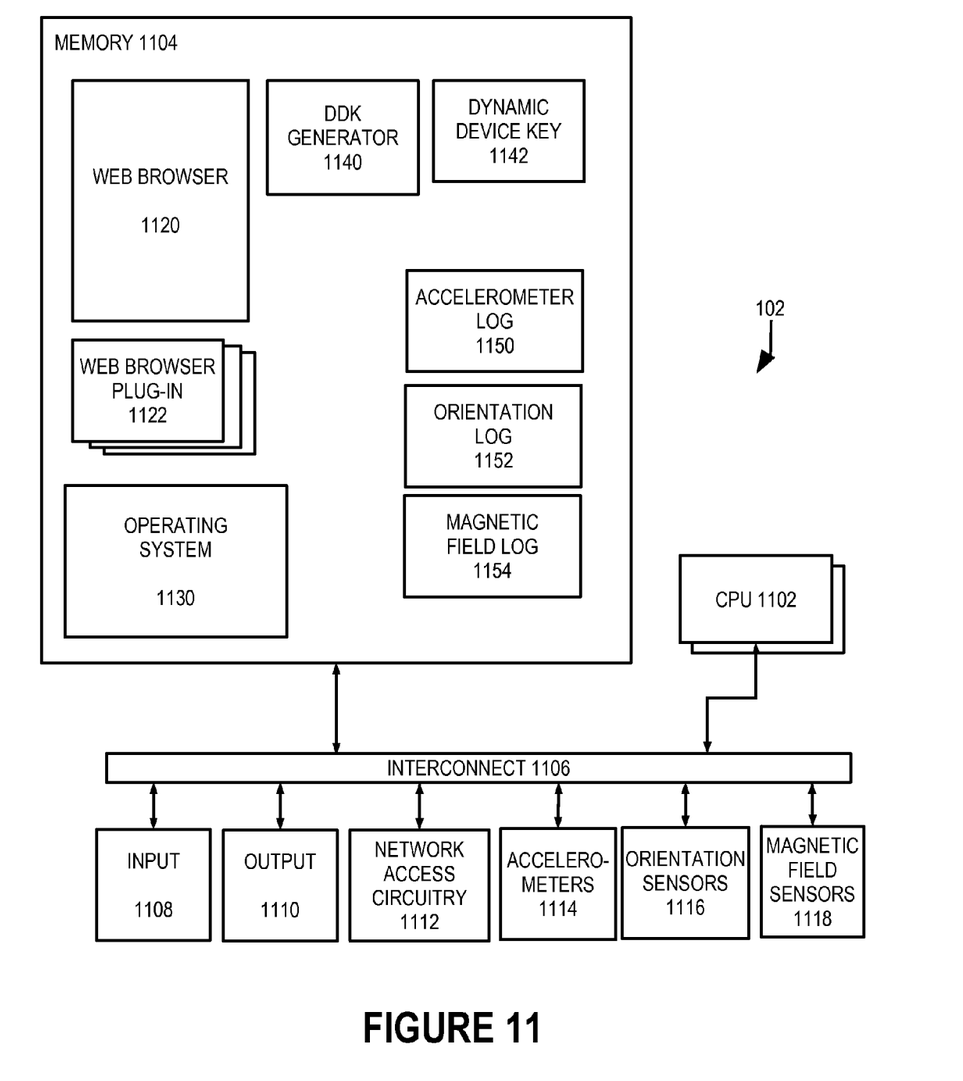
FIG. 11 is a block diagram showing in greater detail the device of FIG. 1.

Device 102 is a personal computing device and is shown in greater detail in FIG. 11. Device 102 includes one or more microprocessors 1102 (collectively referred to as CPU 1102) that retrieve data and/or instructions from memory 1104 and execute retrieved instructions in a conventional manner. Memory 1104 can include generally any computer-readable medium including, for example, persistent memory such as magnetic and/or optical disks, ROM, and PROM and volatile memory such as RAM.

CPU 1102 and memory 1104 are connected to one another through a conventional interconnect 1106, which is a bus in this illustrative embodiment and which connects CPU 1102 and memory 1104 to one or more input devices 1108, output devices 1110, and network access circuitry 1112. Input devices 1108 can include, for example, a keyboard, a keypad, a touch-sensitive screen, a mouse, a microphone, and one or more cameras. Output devices 1110 can include, for example, a display—such as a liquid crystal display (LCD)—and one or more loudspeakers. Network access circuitry 1112 sends and receives data through computer networks such as wide area network 104 (FIG. 1).

Accelerometers 1114 measure physical acceleration of device 102 in three dimensions and report measured acceleration through interconnect 1106 to CPU 1102 for storage in accelerometer log 1150. Accelerometers 1114 are known and are not described further herein.

Orientation sensors 1116 measure orientation of device 102 in three dimensions and report measured orientation through interconnect 1106 to CPU 1102 for storage in orientation log 1152. Orientation sensors 1116 are known and are not described further herein.

Magnetic field sensors 1118 measure the earth's magnetic field around device 102 along three dimensions and report measured magnetic fields through interconnect 1106 to CPU 1102 for storage in magnetic field log 1154. Magnetic field sensors 1118 are known and are not described further herein.

A number of components of device 102 are stored in memory 1104. In particular, web browser 1120 is all or part of one or more computer processes executing within CPU 1102 from memory 1104 in this illustrative embodiment but can also be implemented using digital logic circuitry. As used herein, "logic" refers to (i) logic implemented as computer instructions and/or data within one or more computer processes and/or (ii) logic implemented in electronic circuitry. Web browser plug-ins 1122 are each all or part of one or more computer processes that cooperate with web browser 1120 to augment the behavior of web browser 1120. The manner in which behavior of a web browser is augmented by web browser plug-ins is conventional and known and is not described herein.

Operating system 1130 is all or part of one or more computer processes executing within CPU 1102 from memory 1104 in this illustrative embodiment but can also be implemented using digital logic circuitry. An operating system (OS) is a set of programs that manage computer hardware resources and provide common services for application software such as web browser 1120, web browser plug-ins 1122, and DDK generator 1140.

DDK generator 1140 is all or part of one or more computer processes executing within CPU 1102 from memory 1104 in this illustrative embodiment but can also be implemented using digital logic circuitry. DDK generator 1140 facilitates authentication of device 102 in the manner described above.

Dynamic device key 1142, accelerometer log 1150, orientation log 1152, and magnetic field log 1154 are each data stored persistently in memory 1104 and each can be organized as all or part of one or more databases.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for identifying a remotely located device, the method comprising:
   by a processor:
   receiving device identification data from the device, where the device identification data includes:
   a device identifier, where the device identifier is a unique identifier of one of a number of known devices; and
   device environmental data, where the device environmental data represents one or more unique external states of the device within a physical environment, the external states including states of acceleration of the device in physical space;
   determining that the device identifier identifies the device;
   determining that the device environmental data is consistent with corresponding reference device environmental data previously stored for the device; and
   authenticating the device as a recognized device upon determining that the device environmental data is consistent with the corresponding reference device environmental data; where device identification data further comprises internal state data that represents one or more attributes of an internal state of the device and where authenticating the device as the recognized device is performed in response to also determining that the internal state data is consistent with previously stored reference internal state data for the device.

2. The method of claim 1 further comprising:
   sending challenge data to the device, wherein the challenge data specifies a manner in which the device is to gather and form the device identification data, including at least a portion of a history of external states of the device.

3. The method of claim 1 further comprising:
   in response to authenticating the device as the recognized device, adjusting the reference device environmental data in accordance with the device environmental data.

4. A non-transitory computer readable medium configured for use with a computer that includes one or more processors and a memory, the computer readable medium including computer instructions that are configured to cause the computer, by execution of the computer instructions in the one or more processors from the memory, to identify a remotely located device by at least:
   receiving device identification data from the device, where the device identification data includes:
   a device identifier, where the device identifier is a unique identifier of one of a number of known devices; and
   device environmental data, where the device environmental data represents one or more unique external states of the device within a physical environment, the one or more external states including states of acceleration of the device in physical space;
   determining that the device identifier identifies the device;
   determining that the device environmental data is consistent with corresponding reference device environmental data previously stored for the device; and
   authenticating the device as a recognized device upon determining that the device environmental data is consistent with the corresponding reference device environmental data; where device identification data further comprises internal state data that represents one or more attributes of an internal state of the device and where authenticating the device as the recognized device is performed in response to also determining that the internal state data is consistent with previously stored reference internal state data for the device.

5. The computer readable medium of claim 4 wherein the computer instructions are configured to cause the computer to identify a remotely located device by at least also:

sending challenge data to the device, wherein the challenge data specifies a manner in which the device is to gather and form the device identification data, including at least a portion of a history of external states of the device.

6. The computer readable medium of claim 4 wherein the computer instructions are configured to cause the computer to identify a remotely located device by at least also:

in response to authenticating the device as the recognized device, adjusting the reference device environmental data in accordance with the device environmental data.

7. A computer system comprising:

at least one processor;

a computer readable medium that is operatively coupled to the at least one processor;

network access circuitry that is operatively coupled to the at least one processor; and device identification logic (i) that executes at least in part in the at least one processor from the computer readable medium and (ii) that, when executed, causes the at least one processor to identify a remotely located device by at least configuring the processor to:

receive device identification data from the device, where the device identification data includes:

a device identifier, where the device identifier is a unique identifier of one of a number of known devices; and device environmental data, where the device environmental data represents one or more unique external states of the device within a physical environment, the one or more external states including states of acceleration of the device in physical space;

determine that the device identifier identifies the device;

determine that the device environmental data is consistent with corresponding reference device environmental data previously stored for the device; and authenticate the device as a recognized device upon determining that the device environmental data is consistent with the corresponding reference device environmental data; where device identification data further comprises internal state data that represents one or more attributes of an internal state of the device and where authenticating the device as the recognized device is performed in response to also determining that the internal state data is consistent with previously stored reference internal state data for the device.

8. The computer system of claim 7 wherein the device identification logic causes the computer to identify a remotely located device by at least also:

sending challenge data to the device, wherein the challenge data specifies a manner in which the device is to gather and form the device identification data, including at least a portion of a history of external states of the device.

9. The computer system of claim 7 wherein the device identification logic causes the computer to identify a remotely located device by at least also:

in response to authenticating the device as the recognized device, adjusting the reference device environmental data in accordance with the device environmental data.

\* \* \* \* \*